Dec. 1, 1953     H. L. PURDY     2,661,105
LOADER AND ELEVATOR ATTACHMENT FOR VEHICLES
Filed Aug. 18, 1951     2 Sheets-Sheet 1
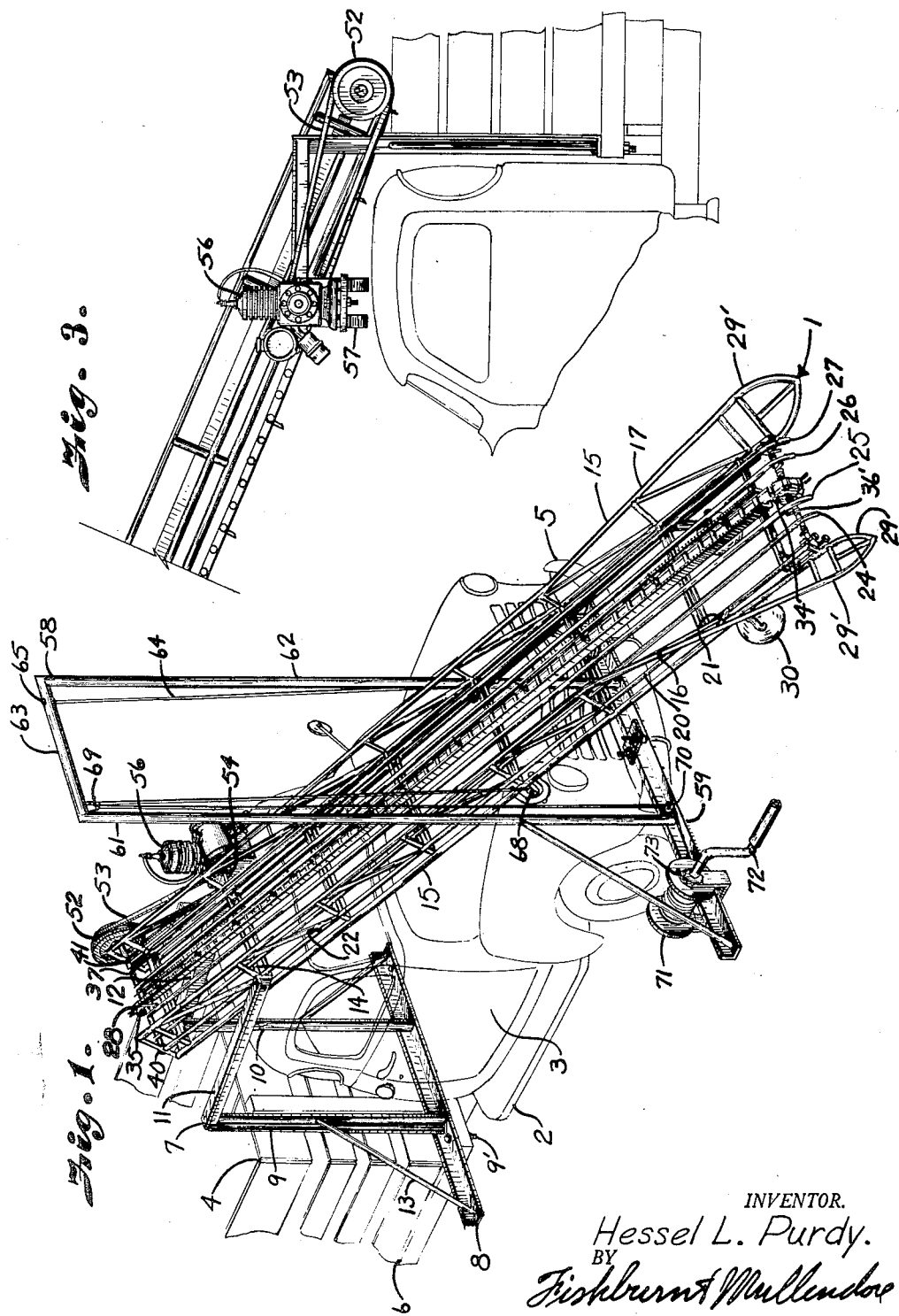
INVENTOR.
Hessel L. Purdy.
BY
Fishburn & Mullendore
ATTORNEYS.

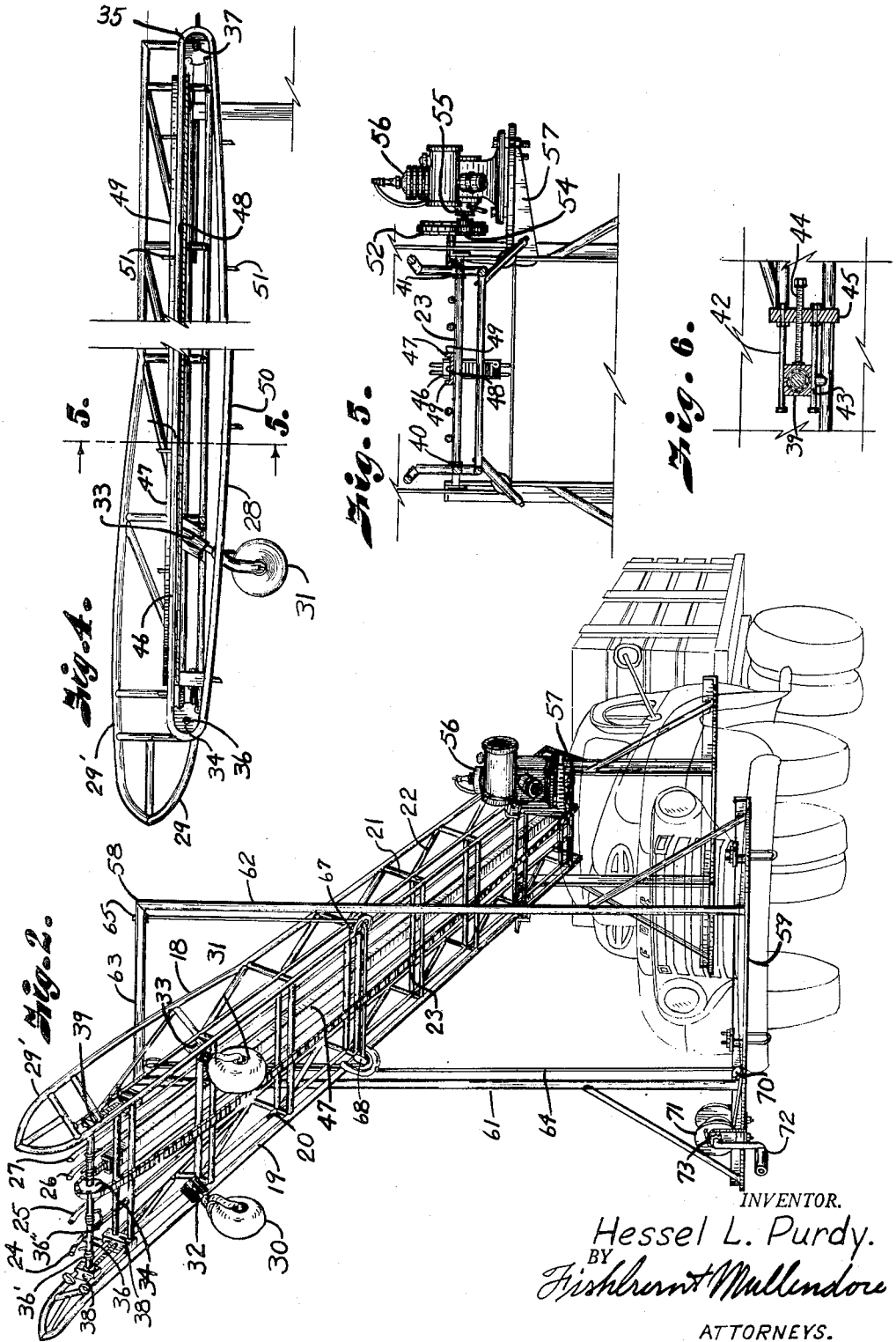

Patented Dec. 1, 1953

2,661,105

UNITED STATES PATENT OFFICE 2,661,105

LOADER AND ELEVATOR ATTACHMENT FOR VEHICLES

Hessel L. Purdy, Braman, Okla.

Application August 18, 1951, Serial No. 242,482

4 Claims. (Cl. 214—83.26)

1

This invention relates to a loader and elevator attachment for trucks, whereby a crop such as baled hay may be loaded from the field, transported to a place of storage, and elevated into a barn loft or the like.

The principal objects of the invention are to provide an attachment of this character that is readily mounted upon a truck and which includes a conveyor that extends downwardly and forwardly over the cab of the truck into a position to permit the driver to maneuver the truck for picking up the bales of hay directly from the field, and to provide for raising the conveyor to a horizontal transport position when the load is to be transported, and for raising the elevator to an upwardly inclined position for elevating the bales of hay from the truck into the loft of a barn or the like.

In accomplishing these and other objects of the invention hereinafter pointed out, I have provided improved structure, the approved form of which is illustrated in the accompanying drawings wherein:

Fig. 1 is a perspective view of the forward portion of a motor truck equipped with a loader and elevator attachment constructed in accordance with the present invention and showing the conveyor in position for picking up bales of hay and loading them into the bed of the truck.

Fig. 2 is a similar view but showing the elevator raised for conveying the bales from the truck into the loft of a barn.

Fig. 3 is a fragmentary side elevational view of the truck and portion of the elevator when in raised position, particularly illustrating mounting of the engine which operates the conveyor mechanism.

Fig. 4 is a longitudinal section through the conveyor.

Fig. 5 is a section through the forward portion of the conveyor on the line 5—5 and looking in the direction of the engine drive.

Fig. 6 is a fragmentary detail view illustrating the adjusting means for the conveyor chain.

Referring more in detail to the drawings:

1 designates a loader and elevator attachment mounted on the forward end of a truck 2. The truck may be of any type such as used about a farm and is here illustrated as having a cab 3 and an open top bed 4 that is spaced from the back of the cab. The truck also includes the usual bumper 5 that is suitably attached to the truck frame and which cooperates with the main sills 6 of the truck for supporting the attachment 1 as now to be described.

The attachment 1 includes a rear frame 7 com-

2 prising a cross member 8 that is adapted to extend transversely across the sills 6 and within the space between the bed 4 and cab 3, as best shown in Figs. 1 and 3. The cross member is attached to the sills of the truck by fastening devices such as U bolts 9'. Extending upwardly from the cross member 8 at the side of the truck opposite the driver are uprights 9 and 10 which extend above the top of the cab and carry forwardly directed arms 11 and 12. The uprights are supported in stable position by braces 13 that connect with the outer ends of the cross member 8 as shown in Fig. 1. This position of the uprights permits mounting of the conveyor so that the attachment does not interfere with the view of the driver of the truck and permits clear vision of the forward end of the conveyor so that the truck may be readily steered into position for picking up bales directly from the field as later described. Extending transversely at the forward ends of the arms 11 and 12 is a cross shaft 14 pivotally mounting an elongated conveyor frame 15 that extends from the ground forwardly of the truck upwardly to a position for discharging bales directly into the truck. The frame may be of any suitable construction, but is shown in the drawings as being formed of pipe or tubing. The frame includes side guides 16 and 17, each comprising upper and lower longitudinal members 18 and 19 and an intermediate longitudinal member 20. The longitudinal members are interconnected at points along the length thereof by struts 21 and braces 22 to provide a relatively light weight truss-like structure. The side frames are connected together at points along the length thereof by transverse members 23 having their ends connected with the intermediate longitudinal members 20 to carry spaced longitudinal guide rails 24, 25, 26, and 27 along which the bales are adapted to be moved by means of an endless conveyor chain 28, later described. The forward ends of the upper and lower longitudinal members of the side frame are curved to connect with each other and form skids 29 that are adapted to move along the ground at the respective sides of the bales to be loaded. The upper portion of the forward ends of the frame are splayed outwardly as shown in Figs. 1 and 2 to form bumpers 29' above the skids 29 to engage and straighten the bales for movement up the conveyor. The forward end of the frame is also supported on caster wheels 30 and 31 that are swivelly mounted in brackets 32 and 33 that are carried on the inner sides of the conveyor frame as best shown in Fig. 2.

The conveyor chain 28 is carried at the respective ends of the frame on sprockets 34 and 35 which are mounted on cross shafts 36 and 37 at the respective ends of the conveyor frame, as best shown in Fig. 4. The cross shafts 36 and 37 have their ends journalled in suitable bearings 38—39 and 40—41, the bearings 38 and 39 being slidably mounted on guide rods 42 and 43, as shown in Fig. 6. The bearings are moved along the guide rods to adjust the tension of the chains by screws 44 threadedly mounted in a cross member 45 of the conveyor frame. The upper run 46 of the chain is guidedly supported within a channel 47 that is supported by the transverse bars 22 and extends substantially along the full length of the chain mid way of the guide rails 26 and 27 so that the links of the chain slide along the web 48 of the channel and are guided by the side flanges 49 thereof, as best shown in Figs. 2, 4 and 5. The lower run 50 of the chain operates below the frame as shown in Fig. 4, although it may be supported by the frame if desired. The chain is provided at spaced points along the length thereof with lugs 51 for engaging the bales to carry them upwardly along the guide rails for discharge off the upper end of the conveyor into the bed of the truck.

The shaft 36 has coil springs 36' mounted thereon and which have finger-like terminals 36" which engage and start the bales onto the conveyor.

The shaft 37 operates the chain and has a pulley 52 that is driven by a belt 53 operating over a pulley 54 on the driven shaft of a reversible, speed reduction gearing unit indicated at 55 and which is connected with an engine 56. The engine 56 is mounted on the arm 12 by means of brackets 57 which also carry the speed reduction unit so that the power shaft thereof is in substantial alignment with the shaft 14. With this arrangement the forward end of the conveyor may be raised and lowered without interferring with the driving connection of the conveyor and the engine remains in vertical position when the conveyor is moved to its various angles of inclination.

In order that the conveyor may be raised to a substantially horizontal carrying position and to an elevated position as shown in Fig. 2, the attachment includes a gantry 58 that is mounted on a cross bar 59 attached to the front bumper of the truck 5 by suitable fastening devices 60. The gantry includes uprights 61 and 62 located at the respective sides of the conveyor frame and which have the upper ends connected by a cross member 63 that is located a sufficient distance above the shaft 14 to allow the desired elevation of the conveyor as later described. The conveyor is raised and lowered in the gantry by means of a hoist mechanism which in the illustrated instance includes a cable 64 having one end attached to the cross member 63 as indicated at 65. The cable extends downwardly and under a pulley 67 carried by the side 15 of the conveyor frame as shown in Fig. 2. The cable then extends across the conveyor frame and upwardly over a pulley 68 to operate over a pulley 69 that is carried by the cross bar 63. The cable then extends downwardly alongside the upright 61 of the gantry and is guided by a pulley 70 to a winding drum 71. The winding drum 71 is carried on the cross bar 59 and is rotated by a hand operated crank 72 and the rotation is controlled by a ratchet mechanism 73, best shown in Figs. 1 and 2. If desired a hydraulic hoist may be substituted for the winding drum without departing from the spirit of the invention.

Assuming that the attachment is mounted on a truck as above described, the operation is as follows:

When the truck reaches the field, the conveyor frame is lowered from a transport position by operating the crank and ratchet mechanism to turn the winding drum to pay out the cable 64 and thereby effect lowering of the conveyor frame under its own weight so that the caster wheels 30 and 31 rest upon the ground. During this movement the rear end of the conveyor frame pivots on a shaft 14 with the drive belt 53 swinging about the axis thereof. The engine is then started and the gear unit 55 is adjusted to operate the conveyor chain in the proper direction. The driver of the truck then steers the truck so that the forward end of the conveyor is moved into position for picking up the bales. Forward movement of the truck pushes the conveyor under the bale until one of the lugs engages the bale, whereupon the conveyor chain moves the bale up the guide rails to deposit it within the bed of the truck. The bales are straightened onto the conveyor by means of the fingers 36" so that the bales do not need to be located in a straight-away-position with respect to the longitudinal direction of the conveyor. The widened or splayed pick-up end of the conveyor frame also eliminates the necessity of manipulating the conveyor into exact alignment with a bale.

When the truck is loaded the conveyor is raised to transport position, that is, to a substantially horizontal position, by rotating the winding drum to wind the cable thereon. The load may then be transported without interference of the attachment. When the truck reaches the place of storage, it is driven alongside the barn and into a position where the forward end of the conveyor may be elevated to the opening of the barn loft. This is effected by operating the winding drum to further raise the forward end of the conveyor frame with the rear end of the frame pivoting downwardly on the cross shaft 14. The men in the truck then have only a short distance to lift the bales to deposit them upon the conveyor frame. The speed reduction unit is now operated in reverse direction to effect reverse movement of the conveyor chain. The upper run of the conveyor chain then moves the bales upwardly along the guide rails of the conveyor frame and into the loft without any additional handling of the bale. After the bales have been unloaded from the truck, the truck may be backed out of position and the conveyor returned to transport position.

It is obvious that the operators are on the truck at all times, one of them steering the truck and the others arranging the bales in the truck as they are deposited by the conveyor, or lifting the bales back on the conveyor when the bales are unloaded. The attachment may remain on the truck at all times during the haying season, as it does not interfere with the use of the truck for other purposes about the farm. However, the attachment may be readily removed upon removing the fastening devices securing the cross members 8 and 59, after which the entire attachment may be moved laterally away from the truck. Then when bale hauling is again started, the attachment is readily replaced and secured in place on the truck as above described.

What I claim and desire to secure by Letters Patent is:

1. A loader and elevator attachment for a truck including an elongated elevator frame, a conveyor support adapted for attachment to the truck, means pivotally mounting the conveyor frame on the support to carry one end of the conveyor frame, caster wheels carrying the other end of the conveyor frame, a motor carried by the support including a reversible speed reducing unit having a driving member in coaxial alignment with said pivotal mounting, an endless conveyor chain having an upper run extending along the conveyor frame for moving the articles on the conveyor, sprockets supporting the chain, shafts for mounting the sprockets at the ends of the conveyor frame, a driving member on the shaft nearest the pivotal mounting, means connecting the driving members, a gantry adapted for attachment to the front of a truck and having a height to extend above the horizontal level of the pivotal means, and lifting means connecting the gantry with the conveyor to lift the wheel supported end to a substantially horizontal carrying position and to a substantially upwardly inclined position for elevating the articles from the truck.

2. An attachment for a truck having a bed, a cab spaced from the bed and a front bumper, said attachment including an elongated frame adapted for support by the truck at the rear of the cab and having uprights terminating in forwardly extending arms, an elongated conveyor frame pivotally supported by the arms and extending downwardly and forwardly from the front of the truck, wheels carrying the forward end of the conveyor frame, an endless conveyor carried by the conveyor frame, an engine carried on one of the arms of the frame, a driving connection between the conveyor and the engine, a gantry having a transverse member adapted for attachment to the bumper of the truck and having legs extending upwardly from the transverse member and carrying a cross member above the pivotal mounting of the conveyor frame said transverse member having an end projecting beyond the bumper, a winding drum on the projecting end of the transverse member, a pulley on the cross member of the gantry, a cable connecting the conveyor frame with the winding drum and operating over the pulley for raising the conveyor frame upon actuation of the winding drum.

3. A bale pick up attachment for a truck having a bed for hauling the bales, said attachment including a frame adapted for support by the truck at the forward end of the bed and having uprights terminating in forwardly extending arms, an elongated conveyor frame pivotally supported by forward ends of the arms and extending downwardly and forwardly from the front of the truck and rearwardly and upwardly from said arms, wheels carrying the forward end of the conveyor frame, an endless conveyor carried by the conveyor frame, an engine carried on the forward end of one of the arms, a driving connection between the conveyor and the engine, a gantry adapted for attachment to a front portion of the truck and extending upwardly above the pivotal mounting of the conveyor frame between the wheel supported end and the forward end of said arms, and lifting means connecting the conveyor frame with the gantry for raising the wheel supported end of the conveyor frame to a transport position.

4. A bale pick up attachment for a truck having a bed for hauling the bales, said attachment including a frame adapted for support by the truck at the forward end of the bed and having uprights terminating in forwardly extending arms, an elongated conveyor frame pivotally supported by the arms and extending downwardly and forwardly from the front of the truck, wheels carrying the forward end of the conveyor frame, an endless conveyor carried by the conveyor frame, an engine on the support, a driving connection between the conveyor and the engine, a gantry adapted for attachment to a front portion of the truck and extending upwardly above the pivotal mounting of the conveyor frame, a winding drum associated with the gantry, and lifting means connecting the conveyor frame with the gantry for raising the wheel supported end of the conveyor frame to a transport position and to an upwardly inclined position to elevate the bales when unloading.

HESSEL L. PURDY.

References Cited in the file of this patent

UNITED STATES PATENTS

| Number | Name | Date |
|---|---|---|
| 1,306,597 | Krogen | June 10, 1919 |
| 2,209,625 | Jensen | July 30, 1940 |
| 2,355,711 | Dolyniuk | Aug. 15, 1944 |
| 2,410,996 | Patterson | Nov. 12, 1946 |
| 2,418,726 | Rogers, Jr. | Apr. 8, 1947 |
| 2,525,870 | Crofoot | Oct. 17, 1950 |
| 2,536,763 | Miller | Jan. 2, 1951 |
| 2,539,021 | Kitchens | Jan. 23, 1951 |
| 2,541,523 | Lang | Feb. 13, 1951 |
| 2,543,302 | Rossiter | Feb. 27, 1951 |
| 2,570,530 | Domitrovic | Oct. 9, 1951 |
| 2,586,324 | Graves | Feb. 19, 1952 |
| 2,593,023 | Haase | Apr. 15, 1952 |